Sept. 28, 1971 E. K. SHENK 3,608,454

IMBIBITION INTERVAL TIMER AND ANNUNCIATOR

Filed June 27, 1968 2 Sheets-Sheet 1

INVENTOR.
Edwin K. Shenk

BY

Brown and Mikulka
and
Gerald L. Smith
ATTORNEYS

| transistor | $Q_1$ | $Q_2$ | $Q_3$ | $Q_4$ | $Q_5$ |
|---|---|---|---|---|---|
| standby status | off | off | off | off | off |
| $S_1$ $S_2$ closed and released | off | on | off | on | on |
| status at trip point of trigger (A) | on | off | off | on | on |
| status at and following trip point of trigger (B) | on | off | on | off | on |
| standby status | off | off | off | off | off |

monitor light
alarm

INVENTOR.
Edwin K. Shenk
BY
Brown and Mikulka
and
Gerald L. Smith
ATTORNEYS

United States Patent Office
3,608,454
Patented Sept. 28, 1971

3,608,454
IMBIBITION INTERVAL TIMER AND ANNUNCIATOR

Edwin K. Shenk, Littleton, Mass., assignor to Polaroid Corporation, Cambridge, Mass.

Filed June 27, 1968, Ser. No. 740,518
Int. Cl. G03b *17/52*
U.S. Cl. 95—13 20 Claims

ABSTRACT OF THE DISCLOSURE

A timer-annunciator system for use with photographic cameras of the self-developing variety. The device functions to energize a warning light continuously during the film developing-imbibition process interval and to sound an audible alarm at the conclusion of the interval. Following the audible alarm, the electronic circuitry of the system is automatically de-activated.

BACKGROUND OF THE INVENTION

This invention relates to photographic apparatus for use in cameras wherein film is both exposed and processed. More particularly, the invention concerns a timing apparatus designed for use in conjunction with the development process performed by the mechanism of such cameras.

Self-developing cameras generally incorporate a processing mechanism adapted for use with a multi-component film assembly. For the most part, the structure of the film assemblies comprises a photosensitive sheet or element which is exposed by the lens system of the camera in conventional manner to form thereon a latent image. This sheet usually is combined in superposed relation with an image-receiving sheet or element and with a pod releasably containing a processing liquid. During the film processing sequence, the entire assembly, including both superposed elements and intermediately disposed pod, is drawn through a spreader mechanism. The spreader mechanism serves to rupture the pod and to distribute the developing liquid from the pod evenly between the two contiguous sheets. The imbibition process resulting from this liquid distribution serves to transfer, at least in part, image components from the photosensitive element to the image- or print-receiving element. At a predetermined stage of the diffusion transfer process, the print-receiving element and the photosensitive element are separated from their superposed relationship. A fully developed print is then provided at the surface of the print-receiving sheet.

The time interval over which the above discussed imbibition process takes place should be accurately established by the camera operator. This timing control is particularly important during the processing sequence of certain of the color film formats used with the diffusion transfer process. Especially where these color film structures incorporate an image-receiving element having a collection of color dye layers, each representing individual color aspects, the timing of the imbibition interval should be monitored carefully to assure a proper color balance for the completed print. During this color format imbibition interval, the liquid developing agent functions to migrate successively through each of a series of superposed dye layers. Should the imbibition interval not be terminated at a proper point in time, the contribution of one or more dye layers to overall color balance may not be proper. In cases where the imbibition interval is shortened beyond acceptable latitudes, one or more of these dye layers may not be assured an opportunity to contribute one or more color aspects to the completed image. Similarly, should the imbibition interval be lengthened beyond acceptable latitudes, one or more of the dye layers may unduly influence the color of the finally processed print.

To assure a properly timed imbibition interval, it is desirable to incorporate some form of timing device within the self-developing photographic camera to signal the end of the predetermined imbibition period. Such timing implements should be automatically responsive to the initiation of the self-developing process while not interfering with its functioning. When installed within a camera housing, the devices should impose no additional manual steps or maneuvering on the part of the camera operator. The timing systems should represent an automated function of the entire camera system of which it is a part. However, to assure fail-safe reliability, the status of operation of this important component should preferably be continuously apparent to the camera operator during the imbibition interval.

SUMMARY OF THE INVENTION

The instant invention provides timing system and apparatus for incorporation within cameras of the self-developing variety. Having a dual signaling function, the inventive system is designed to apprise a camera operator that an imbibition timing interval is underway and continuing. In addition to providing this continuing signal, the system announces the end of the imbibition interval so that the process may be terminated.

As a consequence of this dual signaling function the annunciator arrangement of the invention provides a "fail-safe" characteristic. By virtue of this "fail-safe" characteristic, a camera operator may be alerted to any malfunction occurring during the timing sequence or of a total failure of the timer device.

A preferred embodiment of the invention is electronic and adaptable to miniaturization. As a consequence, the invention lends itself to physical insertion within camera structures without a major or significant restructuring of housings or processing implements.

The electronic annunciator system of the invention is further characterized in possessing a self-deenergization function. With such an arrangement, the system resets itself at the end of each imbibition interval without further effort on the part of the operator. As a result, a sequence of pictures may be taken, processed and timed without continual cognizance or awareness on the part of the operator.

The invention accordingly comprises the system and apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION OF THE DRAWINGS

The imbibition interval timing system of the present invention functions to apprise a camera operator of the presence of an energized timing function. In addition to being made aware of the pendency of a timed imbibition interval, the operator is alerted at the termination of that time interval both by the sound of an audible alarm and by virtue of the deenergization of a monitoring light. At the termination of the relatively short audible alarm, the circuitry embodying the invention automatically returns to a standby or "off" status. This entire imbibition interval and timing system is readily accommodated within the housing of a conventional self-developing camera.

Figure 1:
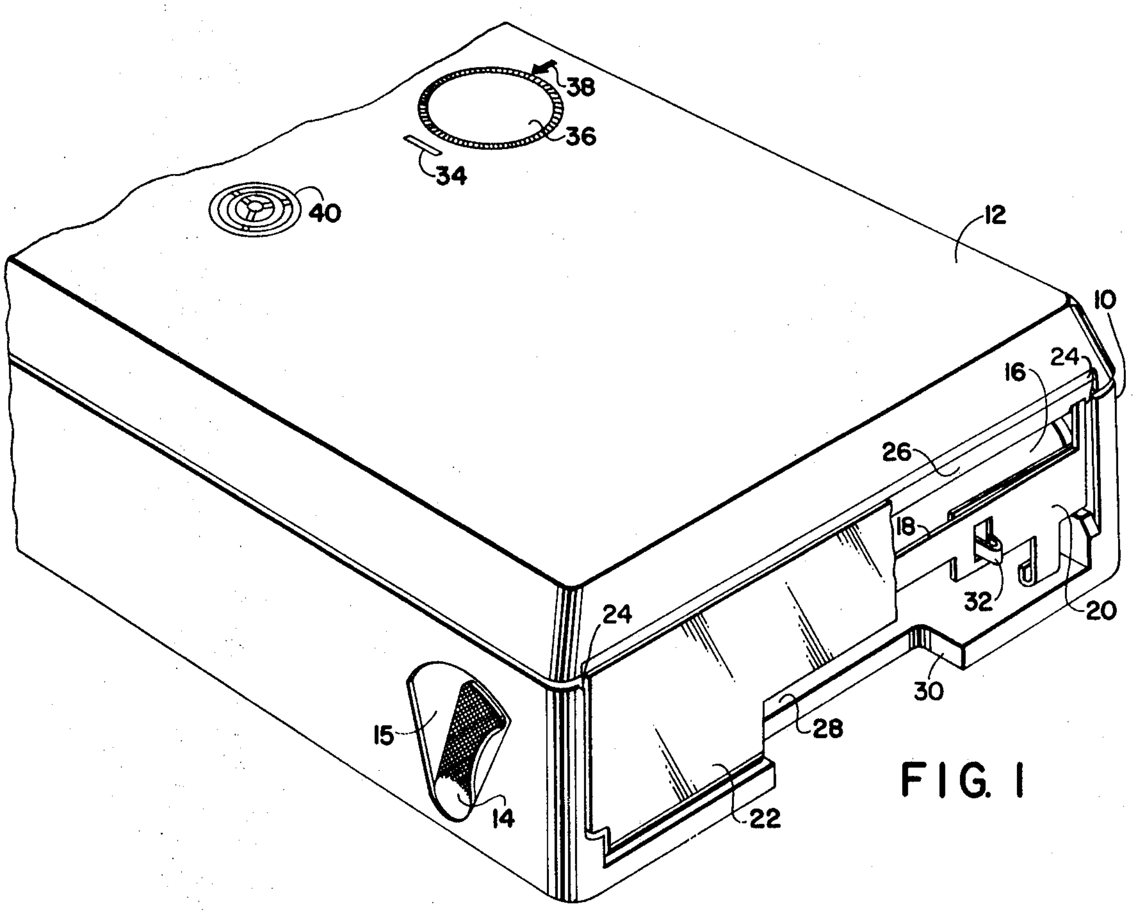
FIG. 1 is a fragmentary perspective view of a camera housing or casing incorporating the annunciator system of the invention, showing one embodiment for a switching mechanism which may be incorporated within the camera access door.

Referring to FIG. 1, the signaling and adjustment components of an annunciator system according to the present invention are illustrated as mounted for operation upon one end of the rearward portion of a popular variety of self-developing camera. This portion of the camera is shown to include a main housing section 10 to which is pivotally attached a camera back 12. Camera back 12 is releasably attached to the housing 10 by a latching means, part of which is depicted as an actuating lever 14 slidably mounted within a depression 15 formed in the housing. The camera back 12 is also designed to retain processing rollers or the like through which the exposed multi-element film structure is drawn to commence the development process. One of these rollers is visible at 16 behind an elongate aperture 18. Aperture 18 is formed as a portion of the structure of an underlying end plate 20. To assure the lighttight integrity of the exposure chamber of the camera, a rectangular door 22 is pivotally attached to the underlying end plate 20 at 24. Torsional springs, not shown, serve to maintain the door in a biased closed position against an elongate bar element 26 during film exposing sequence. Film egress door 22 additionally incorporates a centrally located recessed and angular faced panel portion 28, which cooperates with a narrow slot 30 in the main housing 10 to provide a passage for film positioning draw tabs, not shown. These draw tabs will function in connection with film leader means to progressively and sequentially position the photosensitive film sheet elements before the lens axis of the camera. When such tabs are drawn through the panel portion 28, each exposed film assembly is positioned before the processing rollers or the like for withdrawal from the camera structure through the elongate aperture 18. When the multi-element film structure is pulled through the processing system disposed within the camera back 12, a developer liquid is spread between the superposed film layers, and as a result, the imbibition process or development sequence is considered to commence.

The imbibition timing system of the invention is energized in correspondence with the aforesaid commencement of the development process as a result of the actuation of a spring tensioned, normally open dual contact switch 32. Switch 32 is pictured mounted upon the internal side of the end plate 20. The switch is held in open circuit condition by the closing pressure of the access door 22. Inasmuch as the door is opened during the removal of film through the processing rollers, the annunciator circuitry may be energized at the commencement of film removal. This energization is effected in two discrete steps.

To apprise the camera operator that a timing sequence is functioning properly and underway, a signal lamp 34 is energized throughout the imbibition interval. A rotatable adjustment knob 36 is inserted within the camera back 12 to permit camera operator selection of an appropriate development time interval. To effect an appropriate adjustment, indicia disposed about the periphery of the dial 36 are moved into coincidence with an index point 38. Camera back 12 is also adapted to retain a sound generating transducer-annunciator beneath a protective grill shown at 40. At the termination of the imbibition interval, the timing system deenergizes the lamp at 34 and simultaneously energizes the sound producing mechanism situate beneath the protective grill at 40. Following this audible signal, the system assumes a standby or quenched status in anticipation of the next processing sequence. It is to be noted that following the removal of one film frame through the open axis door 22, the door closes and causes the reopening of the contacts of switch 32.

A preferred embodiment for circuitry capable of performing the imbibition timing, visual and audible signaling along with the self-quenching functions described above is illustrated in connection with FIGS. 2 and 3. This initial embodiment is characterized by the incorporation of two triggering networks which are selectively responsive to voltage levels developed within an R-C timing arrangement.

Figure 2:
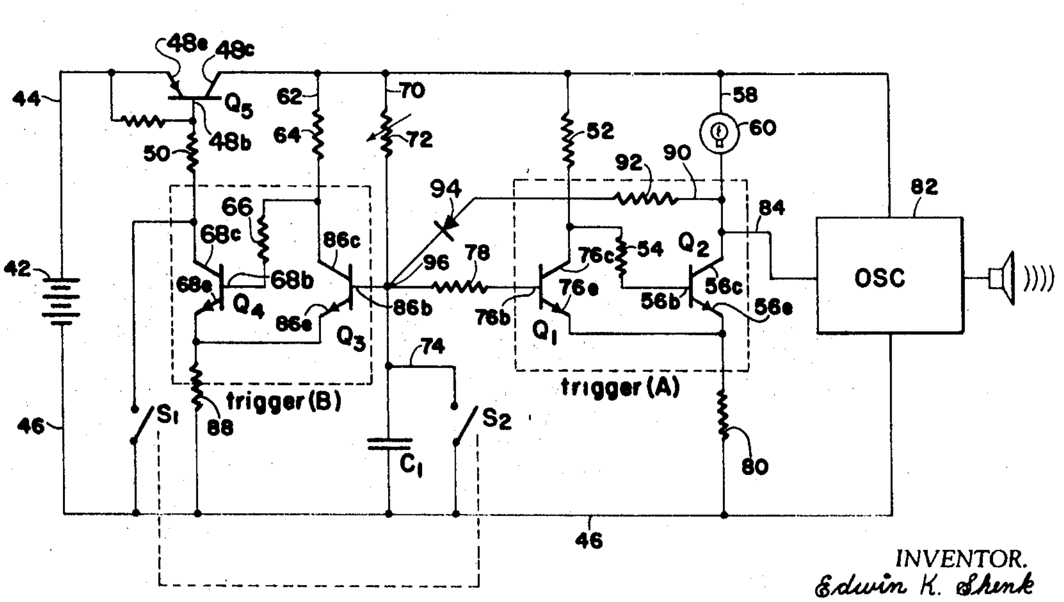
FIG. 2 is a circuit diagram of one embodiment of the invention.

Looking to FIG. 2, these two trigger networks are identified as (A) and (B). The circuitry, including the triggers (A) and (B), is powered from a battery source 42 having trunk leads 44 and 46. Energization of the annunciator circuitry is effected upon the simultaneous closure of normally open switches $S_1$ and $S_2$. These switches correspond to the spring tensioned contacts shown at 32 in FIG. 1. The closure of switch $S_1$ causes a transistor $Q_5$ having base, emitter and collector electrodes respectively at **48*b*, 48*e* and 48*c* to be forward biased into conduction. A base bias resistor is inserted at 50 for limiting the base current of the transistor $Q_5$. The forward biasing of transistor $Q_5$ permits the simultaneous forward biasing of transistor $Q_2$ by virtue of a current through line 44 and resistors 52 and 54. Transistor $Q_2$ is shown having base, emitter and collector electrodes 56*b*, 56*e* and 56*c*, respectively. The conductive status of transistor $Q_2$ permits the passage of current from line 44 through line 58. As a result, an imbibition interval incandescent signal lamp 60 is energized. Lamp 60 corresponds to the signal lamp 34** described in connection with FIG. 1.

Returning to transistor $Q_5$, its momentary energization from switch $S_1$ simultaneously causes the forward biasing of the emitter-base junction of transistor $Q_4$ by virtue of a current through line 62 and resistors 64 and 66. Transistor $Q_4$ is shown having base, emitter and collector electrodes, respectively, at **68*b*, 68*e* and 68*c***. A conduction of current through transistor $Q_4$ permits a continued presence of a forward biasing current at the emitter-base junction of transistor $Q_5$. Transistor $Q_5$ is thereby held "on" or clamped as the switch $S_1$ returns to an open status.

An R-C timing arrangement for the annunciator system is present at line 70 and is seen to include a variable resistor 72 and a capacitor $C_1$. Conduction of current through transistor $Q_5$ serves to charge capacitor $C_1$ through resistor 72 at a rate dependent upon the value of resistance inserted at resistor 72. The resistance value present at variable resistor 72 is selected by manual adjustment of a knob such as described at 36 in connection with FIG. 1. The commencement of the timing interval is delayed by the temporary closure of normally open switch $S_2$, which when closed functions to insert line 74 as a shunt across capacitor $C_1$. Actuated in coincidence with switch $S_1$, the switch $S_2$ is reopened at the point in time when a film frame has passed through the processing means and the access door as at 22, is permitted to close. It is to be understood that the switch $S_2$ also may be positioned upon the camera housing such that it will reopen at any predetermined point in the time interval during which film is pulled through the processing rollers.

Figures 3, 4:
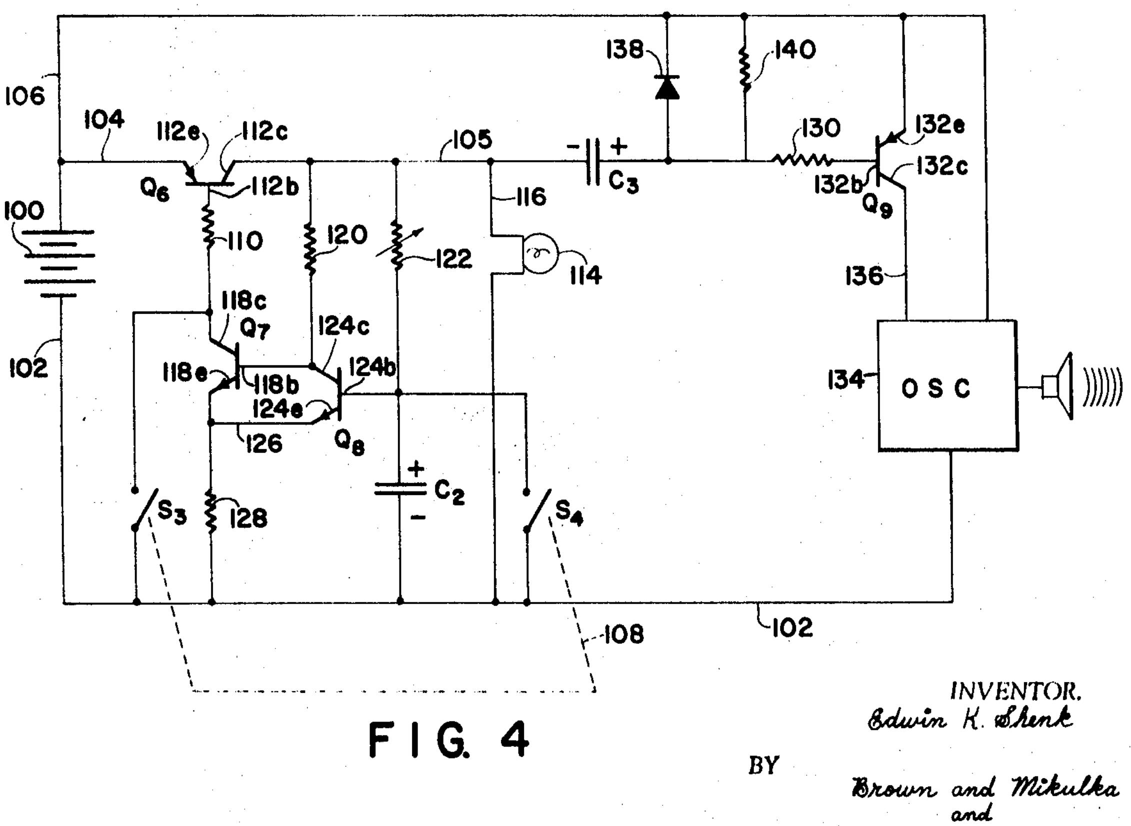
FIG. 3 is a chart showing the conductive status of the transistors within the circuit of FIG. 1 during the operation of the annunciator device.
FIG. 4 is a circuit diagram showing another embodiment of the invention.

Referring to FIG. 3, the status of the transistors in the circuit at this point in the timing cycle as the switches $S_1$ and $S_2$ have been closed and released is indicated in chart form. At this point in the cycle, the monitor light 60 is energized and remains energized throughout the timing interval.

As the imbibition interval terminates, the time variable voltage developed within the R-C timing circuit will have reached a predetermined triggering value. As a result, transistor $Q_1$ having base, emitter and collector electrodes **76*b*, 76*e* and 76*c*, respectively, is forward biased through a resistor 78 into a conductive state. Transistors $Q_1$ and $Q_2$ form a Schmitt trigger arrangement denoted on the drawing by dotted lines as a trigger (A). The conductive status of transistor $Q_1$ serves to create a bypass of the forward biasing potential applied at the emitter-base junction of transistor $Q_2$ causing it to assume a nonconductive state. The presence of a resistor at 80 enhances a regenerative effect common in Schmitt trigger arrangements. An oscillator or crystal driver circuit shown generally at 82 is connected through a triggering line 84 to be momentarily energized upon the removal of a forward bias at transistor $Q_2$. The oscillator-transducer arrangement at 82 may be of the variety incorporating a piezo-electric transducer having a vibratory surface from which acoustic energy is radiated in feedback combination with an oscillator circuit. Energization of the arrangement provides an audible alarm signaling the termination of the imbibition interval. The vibratory crystal used with the circuit may be mounted beneath a grill as shown at 40** in FIG. 1. Returning to FIG. 3, the status of the transistors within the circuit are displayed in chart form at the point in time at which trigger (A) has been activated.

Turning to trigger (B) of the circuitry, as trigger (A) is activated, a voltage is impressed from the timing circuit upon the base of transistor $Q_3$, thereby triggering it into conduction. Transistor $Q_3$ in connection with transistor $Q_4$ form a second Schmitt trigger. As transistor $Q_3$ conducts, the forward biasing current impressed upon transistor $Q_4$ is bypassed and it assumes an "off" state. A resistor 88 is inserted in the emitter circuit of transistor $Q_4$ to enhance a regenerative effect for improving the sensitivity of the trigger. The non-conductive status of transistor $Q_4$, in turn, causes the removal of a forward bias at transistor $Q_5$ allowing it to assume a non-conductive state. To improve the response time between the activation of trigger (A) and trigger (B), a feedback line 90 having a resistor 92 and diode 94 from line 58 to the junction 96 may be inserted as illustrated. The conductive status of the transistors in the circuit at the point in time at which the trigger (B) is activated is shown in FIG. 3 in chart form. As transistor $Q_5$ is deenergized, the entire system reassumes a standby status. This quenching action eliminates the need for additional switching mechanisms isolating the power source 42 from the circuit during periods of nonusage.

A second embodiment for circuitry capable of performing the imbibition timing, visual and audible signaling and self-quenching functions of the instant annunciator system is depicted at FIG. 4. This embodiment is characterized in the incorporation of a singular Schmitt triggering arrangement in combination with the selective charging of two capacitor elements. Similar to the earlier described embodiment, the present circuitry utilizes a conventional sonic-transducer arrangement for generating an audible alarm.

Referring to FIG. 4, the alternate circuit arrangement is shown powered by a battery source 100 which is, in turn, connected to trunk leads 102, 104, and 106. As in the earlier embodiment, the circuit is energized upon the momentary closure of normally open switches $S_3$ and $S_4$. These switches function in correspondence with the switching arrangement at FIG. 1 illustrated as element 32. The simultaneous closure of switches $S_3$ and $S_4$ is indicated by the dashed line connection 108. As switch $S_3$ is momentarily closed, a voltage is impressed across resistor 110 to the base **112*b* of transistor $Q_6$, thereby biasing it into a conductive state. The resulting conductive status effected along line 104 including emitter and collector electrodes 112*e* and 112*c*, respectively, of transistor $Q_6$ causes both the energization of a monitoring incandescent lamp 114 on line 116 and the impression of a forward biasing voltage at the base electrode 118*b* of transistor $Q_7$ through resistor 120. Having collector and emitter electrodes 118*c* and 118*e*, respectively, the transistor $Q_7$ functions to hold transistor $Q_6$ in a conductive state. Lamp 114 is the monitoring signal lamp 34** described in connection with the camera housing at FIG. 1.

Switch $S_4$ remains closed until a singular film frame structure is drawn through the processing rollers at the end of the camera housing. In this closed position, the switch functions to shunt the capacitor $C_2$, thereby delaying the commencement of the timing sequence until the film is entirely removed from the camera housing. As switch $S_4$ is opened, however, timing capacitor $C_2$ is charged through variable resistor 122. This latter resistor is manually adjustable by the camera operator through the medium of a control knob or the like as discussed at element 36 in connection with FIG. 1. As the imbibition interval terminates, the time variable voltage developed within the R-C timing circuit will have reached a predetermined triggering value, as a result of which transistor $Q_8$ becomes forwardly biased. Transistor $Q_8$ having base, collector and emitter electrodes, respectively, indicated at **124*b*, 124*c* and 124*e*, is connected to form a Schmitt triggering arrangement with transistor $Q_7$. Accordingly, as transistor $Q_8$ conducts, the forward biasing voltage at base 118*b* of transistor $Q_7$ is shunted across line 126 and resistor 128. Resistor 128** functions to enhance a regenerative effect for improving the sensitivity of the triggering arrangement.

As the R-C timing circuitry actuates the triggering mechanism to deactivate transistor $Q_6$, a capacitor $C_3$ on line 105 will be pulled toward the ground potential at line 102 through the resistance imposed by lamp 114. This, in turn, causes a forward biasing of PNP transistor $Q_9$ through resistor 130 due to the charging of capacitor $C_3$. Transistor $Q_9$ is shown having base, emitter and collector electrodes, respectively, at **132*b*, 132*e* and 132*c*. The momentary conductive status at transistor $Q_9$ permits a corresponding signal of finite duration to be introduced to a conventional oscillator-transducer arrangement 134 from along line 136. As a result, a short audible alarm signal is generated. Diode 138 is inserted between lines 104 and 106 for purposes of permitting the discharge of capacitor $C_3$ during the period of conduction at transistor $Q_6$. Similarly, resistance 140** is inserted between these leads for purposes of adjusting the triggering sensitivity of transistor $Q_9$.

Following the momentary activation of a sonic alarm signal, the circuit assumes an inactive or quenched status and remains in a standby condition pending the next sequential imbibition timing operation.

The annunciator system described in the foregoing embodiments is characterized in providing a highly desirable design flexibility. It has no moving parts and it utilizes conventional and relatively inexpensive components. As a result, it may be fabricated in miniaturized scale and incorporated within a wide variety of self-developing camera systems.

Since certain changes may be made in the above system and apparatus without departing from the scope of the invention, it is intended that all matter contained in the above description or shown in the accompanying drawings shall be interpreted as illustrative and not in a limiting sense.

What is claimed is:

1. Photographic apparatus for exposing photosensitive film sheets and causing their development by imbibition over predetermined time intervals comprising:

- a housing incorporating processing means for causing said development;
- first and second annunciators for indicating the status of said imbibition development;
- control means including:
  - an electrical timing network including capacitor means coupled with variable resistor means manually adjustable to derive a time variable voltage having a predetermined value at the termination of said time interval,
  - switching means responsive to the movement of said film sheets through said processing means for causing the energization of said control means, voltage sensitive trigger circuit means including a transistor stage for causing the de-energization of said control means in response to the attainment of said predetermined voltage value, and means responsive to said energization of said control means for energizing said first annunciator throughout a said predetermined time interval, and responsive to said de-energization of said control means at the end of said predetermined time interval for energizing said second annunciator for a finite interval.

2. The photographic apparatus of claim 1 in which said first annunciator is an incandescent lamp.

3. The photographic apparatus of claim 1 wherein said second annunciator functions upon energization to provide an audible signal.

4. The photographic apparatus of claim 3 wherein said second annunciator comprises an oscillator circuit coupled with a piezo-electric transducer having a vibratory surface from which acoustic energy may be radiated.

5. The photographic apparatus of claim 1 in which said switching means is operative to respond to the movement of said film sheets through said processing means in a manner delaying the energization of said electrical timing network until a given one of said film sheets is substantially fully processed.

6. The photographic apparatus of claim 1 wherein:

said first annunciator comprises an incandescent lamp connected to be energized in coincidence with the said energization of said control means and to be deenergized simultaneously with the deenergization of said control means; and said second annunciator comprises an oscillator circuit coupled with a piezo-electric transducer having a vibratory surface from which acoustic energy may be radiated.

7. The photographic apparatus of claim 6 wherein said switching means is adapted to respond to the removal of each said processed film sheet from said camera housing in a manner delaying the actuation of said timing network until said processed film sheet is substantially removed from said camera housing.

8. An annunciator system for use with photographic cameras having means to process photographic film units by imbibition over predetermined time intervals comprising:

first and second annunciators for indicating the status of said imbibition;

switch means actuable in response to the movement of one of said film units through said processing means for energizing said system at the commencement of said predetermined interval;

control means comprising:

an electrical timing network including capacitor means coupled with variable resistor means manually adjustable to derive a time variable voltage having a predetermined value at the termination of said time interval, a voltage sensitive trigger circuit including a transistor stage and operative to cause the de-energization of said control means in response to the attainment of said predetermined voltage value, and means responsive to the actuation of said switch means for energizing said first annunciator throughout said predetermined interval, and responsive to said de-energization of said control means for energizing said second annunciator for a finite interval and de-energizing said system.

9. The annunciator system of claim 8 wherein:

said first annunciator is an incandescent lamp connected to be energized in coincidence with the said energization of said control means and to be deenergized simultaneously with the deenergization of said control means; and said second annunciator comprises an oscillator circuit coupled with a piezo-electric transducer having a vibratory surface from which acoustic energy may be radiated.

10. An annunciator system for use with photographic cameras having means to process photosensitive film sheets by imbibition over predetermined time intervals comprising:

first and second annunciators for indicating the status of said imbibition development;

timing means including:

an electrical timing network including capacitor means coupled with variable resistor means manually adjustable to derive a time variable voltage having a predetermined value at the termination of said time interval;

switch means responsive to the movement of said film sheets through said processing means for causing the energization of said timing means;

a first voltage sensitive trigger circuit operative to cause the energization of said second annunciator means in response to the receipt of said predetermined voltage value; and a second voltage sensitive trigger circuit operative to cause the deenergization of said timing means in response to the attainment of said predetermined voltage value and following the actuation of said first trigger circuit.

11. The annunciator system of claim 10 wherein:

said first annunciator is an incandescent lamp connected to be energized in coincidence with the said energization of said timing means and to be deenergized simultaneously with the deenergization of said timing means; and said second annunciator comprises an oscillator circuit coupled with a piezo-electric transducer having a vibratory surface from which acoustic energy may be radiated.

12. An annunciator system for use with photographic cameras having means to process photosensitive film sheets by imbibition over predetermined time intervals comprising:

first and second annunciators for indicating the status of said imbibition development;

timing means including:

an electrical timing network including first capacitor means coupled with variable resistor means manually adjustable to derive a time variable voltage having a predetermined value at the termination of said time interval;

switching means responsive to the movement of said film sheets through said processing means for causing the energization of said timing means;

a voltage sensitive trigger circuit including a transistor stage adapted to cause the deenergization of said timing means in response to the attainment of said predetermined voltage value; and second capacitor means coupled with said timing means and adapted to energize said second annunciator when said predetermined value is reached.

13. The annunciator system of claim 12 wherein:

said first annunciator is an incandescent lamp connected to be energized in coincidence with the said energization of said timing means and to be deenergized simultaneously with the deenergization of said timing means; and said second annunciator comprises an oscillator circuit coupled with a piezo-electric transducer having a vibratory surface from which acoustic energy may be radiated.

14. An annunciator system for use with photographic cameras having means to process photographic film units by imbibition over predetermined time intervals comprising:

first and second annunciators for indicating the status of said imbibition development;

switch means actuable in response to the movement of said film unit through said processing means for energizing said system at the commencement of said predetermined interval;

means responsive to said switch means actuation for causing said energization of said first annunciator throughout said predetermined interval;

timing network means for deriving a select output condition at the termination of said predetermined interval; and means responsive to said derivation of said select output condition for energizing said second annunciator for a finite interval at the end of said predetermined interval, and for automatically deenergizing said system following said predetermined interval.

15. The annunciator system of claim 14 in which said switch means is actuable to an energization, thence to a standby status in response to the said movement of said film units for initiating the timing of said predetermined interval.

16. The annunciator system of claim 14 in which said switch means is actuable from a standby to an energization status, thence to a standby status in response to the said movement of said film units for energizing said system at the commencement of a said predetermined interval.

17. The annunciator system of claim 14 in which said means responsive to said derivation of said select output includes trigger means for causing the deenergization of said first annunciator and causing said system to fully assume a standby condition.

18. The annunciator system of claim 14 in which said switch means is operative to respond in a manner delaying the actuation of said timing network means until the said processed film unit is substantially removed from said photographic camera.

19. The annunciator system of claim 14 in which said means responsive to said switch means actuation includes clamping means for sustaining the energization of said system throughout said interval.

20. The annunciator system of claim 19 in which said means responsive to said derivation of said select output condition is operative to automatically deactivate said clamping means at the termination of said predetermined interval whereby said system automatically fully resumes a standby condition following the said derivation of said select output condition.

References Cited

UNITED STATES PATENTS

| | | | |
|---|---|---|---|
| 2,741,961 | 4/1956 | Anton | 95—14 |
| 3,349,685 | 10/1967 | Beuchner | 95—89 |
| 3,463,936 | 8/1969 | Adem | 340—322X |
| 3,204,222 | 8/1965 | Montroy et al. | 340—322X |
| 3,239,830 | 3/1966 | Schmitt | 340—322X |
| 3,287,608 | 11/1966 | Pokrant | 307—293X |
| 3,410,190 | 11/1968 | Browning | 95—13 |

FOREIGN PATENTS

| | | | |
|---|---|---|---|
| 884,288 | 12/1961 | Great Britain | 340—384(E) |

SAMUEL S. MATTHEWS, Primary Examiner

M. L. GELLNER, Assistant Examiner